Patented Aug. 18, 1931

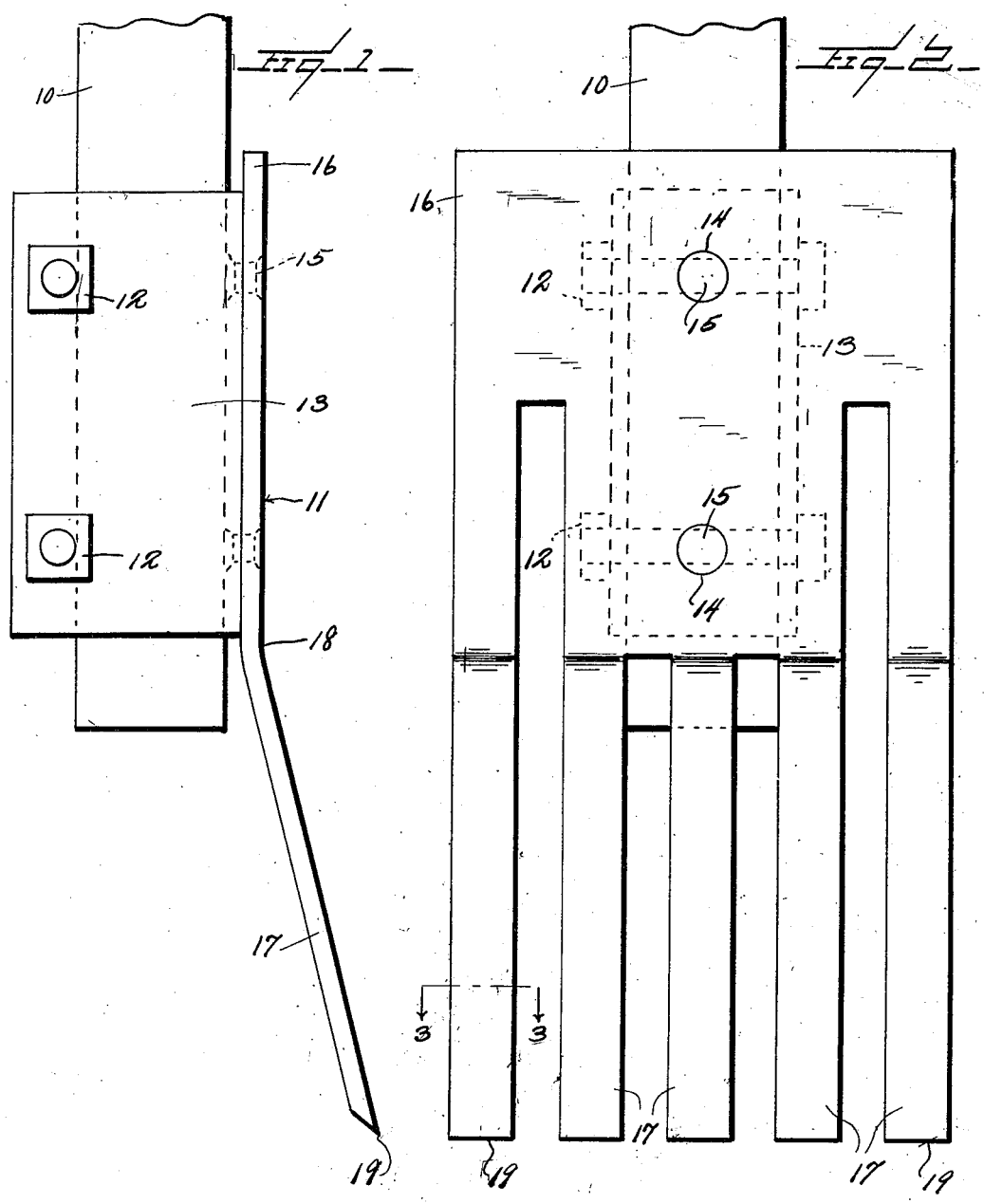

1,819,662

UNITED STATES PATENT OFFICE

CHARLES J. VIEG, OF APPLETON, MINNESOTA

WEEDING SHOE

Application filed November 8, 1930. Serial No. 494,369.

The present invention relates to cultivators and more particularly to attachments for cultivators whereby weeds or the like may be uprooted during the cultivating operation.

An object of this invention is to provide a cultivating shoe which may be attached to any conventional cultivator having depending shoe supporting shanks and which when so attached is adapted to pull out weeds or the like by the roots rather than cut the weeds off and turn under the weed which has been cut off.

Another object of this invention is to provide a cultivating shoe of this kind which in addition to its use as a weed cutter may be used for the purpose of forming a dust blanket or the like so as to fill the cracks or furrows in much the same manner as a stiff toothed harrow.

The above and various other objects and advantages of this invention will in part be described in and in part be understood from the following detailed description of the present preferred embodiment, the same being illustrated in the accompanying drawings, wherein:—

Figure 1 is a detail side elevation of a device constructed according to the preferred embodiment of this invention;

Figure 2 is a detail front elevation of the device, and

Figure 3 is a sectional view taken on the line 3—3 of Figure 2.

Referring to the drawings wherein like numerals of reference designate corresponding parts throughout the several views, the numeral 10 designates generally a shank which is attached to any conventional cultivator and the numeral 11 designates generally a weed pulling shoe which is secured to the cultivator shank 10 by means of a clamp 13 or the like, the clamp 13 being of conventional U-shaped construction and provided with securing bolts 12 or the like.

The body of the weed pulling shoe 11 is provided with suitable spaced apertures 14 for receiving bolts or rivets 15 whereby the shoe 11 may be fastened to the clamp 13. The shoe 11 comprises an upper body portion 16 and a plurality of depending prongs or tines 17 which are secured to the body 16 in spaced relation to each other and which preferably have parallel sides and are secured to the body 16 in parallel relation to each other.

The tines 17 are bent outwardly intermediate the ends thereof, as at 18, so that the lower ends of the tines 17 will project forwardly of the body 16. The lower ends of the tines 17 are also sharpened so that a relatively sharp forward cutting edge 19 is provided to facilitate the movement of the shoe 11 through the ground.

While there are at present available a number of weeding shoes which may be attached to cultivators of various types, these shoes are provided with a converging lower end portion, the converging edges of which are relatively sharp and cut off the roots from the upper portion of the weeds. These weed cutters or cultivators throw the dirt to one side or to both sides of the shoe and usually throw a quantity of dirt on top of the cut weeds.

These shoes also leave a substantial portion of the roots of the weeds in the ground and these retained portions frequently start growing again and necessitate the recultivating of the ground for eliminating the weeds. In the structure herein disclosed, the tines 17 are so secured to the body 16 that they will be dragged through the ground and engage the roots, the tines cooperating with each other so as to loosen the dirt about the roots and permit the tangling of the roots in the tines 17.

It will be obvious from the foregoing that the weeding shoe element disclosed will pull all of the roots of the weeds out of the ground and when the shoe 11 becomes clogged with the roots of the weeds they may be readily removed by moving the shank 10 upwardly into inoperative position whereupon the roots of the weeds will drop off the tines 17. Any number of shoes 11 may be secured to the cultivator depending only upon the size or capacity of the cultivator and the number of shanks 10 which are secured thereto.

It is, of course, understood that various changes and modifications may be made in the details of construction and design of the above specifically described embodiment of this invention without departing from the spirit thereof, such changes and modifications being restricted only by the scope of the following claim.

I claim:—

A weed cultivator of the character described, comprising a U-shaped clamp, means for securing the clamp to a cultivator shank, a weeding shoe, and means for securing the shoe to the clamp said shoe comprising a vertically disposed body portion, and a plurality of depending forwardly inclined tines secured to said body in spaced parallel relation to each other, said tines having a keen edge portion on the lower ends thereof.

In testimony whereof I hereunto affix my signature.

CHARLES J. VIEG.